United States Patent
Hayashi

(10) Patent No.: US 12,244,551 B2
(45) Date of Patent: Mar. 4, 2025

(54) SYSTEM, METHOD, AND PROGRAM FOR SPECIFYING CHARACTER-STRING-BASED COMMENT ART

(71) Applicant: DWANGO Co., Ltd., Tokyo (JP)

(72) Inventor: Emiko Hayashi, Tokyo (JP)

(73) Assignee: DWANGO CO., LTD. (JP)

( * ) Notice: Subject to any disclaimer, the term of this patent is extended or adjusted under 35 U.S.C. 154(b) by 0 days.

(21) Appl. No.: 18/043,516

(22) PCT Filed: Dec. 1, 2021

(86) PCT No.: PCT/JP2021/044059
§ 371 (c)(1),
(2) Date: Feb. 28, 2023

(87) PCT Pub. No.: WO2022/180973
PCT Pub. Date: Sep. 1, 2022

(65) Prior Publication Data
US 2023/0328013 A1    Oct. 12, 2023

(30) Foreign Application Priority Data
Feb. 26, 2021    (JP) .................. 2021-029855

(51) Int. Cl.
*H04L 51/066*  (2022.01)
*H04L 51/063*  (2022.01)

(52) U.S. Cl.
CPC .......... *H04L 51/066* (2013.01); *H04L 51/063* (2013.01)

(58) Field of Classification Search
CPC ... H04L 51/066; H04L 51/063; H04N 21/235; H04N 21/4788; G06F 40/169
See application file for complete search history.

(56) References Cited

U.S. PATENT DOCUMENTS 7,716,376 B1 * 5/2010 Price .................. G06F 1/12
709/248
2005/0262542 A1 * 11/2005 DeWeese ............. H04N 21/454
348/E7.071

(Continued)

FOREIGN PATENT DOCUMENTS

| JP | 2013229873 A | 11/2013 |
| JP | 2021079608 A | 5/2021 |
| WO | 2019093463 A1 | 5/2019 |

OTHER PUBLICATIONS

Commentart2@wiki,What is comment art?, online, Jan. 14, 2017, retrieved from the Internet<URL: https://w.atwiki,ip/commentart2/pages/13.html>, 8 pgs.

(Continued)

*Primary Examiner* — Johnny B Aguiar
(74) *Attorney, Agent, or Firm* — Bracewell LLP; Doug F. Stewart; Patrick J. Connolly

(57) ABSTRACT

A comment art management system according to one embodiment displays a target comment art including a character string of a plurality of lines on a plurality of viewer terminals including a target person terminal. The comment art management system includes:
- a receiving unit (communication unit) configured to receive specifying information for specifying the target comment art from the target person terminal;
- a specifying unit configured to specify the target comment art from a plurality of registered comment art based on the specifying information by referring to a database storing the plurality of registered comment art, each of the plurality of registered comment art including a character string of a plurality of lines; and
- a display control unit configured to display the specified target comment art superimposed on the main content displayed on the plurality of viewer terminals.

6 Claims, 9 Drawing Sheets

(56) References Cited

U.S. PATENT DOCUMENTS

| | | | |
|---|---|---|---|
| 2006/0085735 A1* | 4/2006 | Shimizu | G06F 40/169 715/201 |
| 2010/0165396 A1* | 7/2010 | Yamaguchi | H04N 7/17318 358/1.15 |
| 2013/0027425 A1* | 1/2013 | Yuan | G06F 3/0484 345/629 |
| 2014/0255002 A1* | 9/2014 | Baldwin | H04N 21/4788 386/239 |
| 2017/0132461 A1* | 5/2017 | Chan | G06T 11/00 |
| 2019/0108208 A1* | 4/2019 | Chan | G06F 40/169 |
| 2020/0059704 A1* | 2/2020 | Mikoshiba | A63F 13/35 |
| 2020/0195980 A1 | 6/2020 | Chen et al. | |

OTHER PUBLICATIONS

PCT/JP2021/044059 International Search Report dated Jan. 11, 2022, 2 pgs.

* cited by examiner

SYSTEM, METHOD, AND PROGRAM FOR SPECIFYING CHARACTER-STRING-BASED COMMENT ART

TECHNICAL FIELD

One aspect of the present disclosure relates to a comment art management system, a comment art management method, a comment art management program, and a computer-readable recording medium.

BACKGROUND TECHNOLOGY

A mechanism for displaying a comment about content is known. For example, Patent Document 1 describes a comment distribution system that displays a comment together with a video. With this comment distribution system, the terminal device receives comment information from the comment distribution server, displays the video to be played back, reads the comment associated with the commenting time corresponding to the video playback time of the video to be played back from the aforementioned comment information, and displays the read comment together with the video.

RELATED ART DOCUMENTS

Patent Documents

Patent Document 1: Japanese Unexamined Patent Application 2019-208223

SUMMARY OF THE INVENTION

Problem to be Solved by the Invention

There is a demand for a technique that facilitates use of comment art, which can be said to be an aspect of a comment.

Means to Solve the Problem

A comment art management system according to one aspect of the present disclosure is a comment art management system that causes a target comment art including a character string of a plurality of lines to be displayed on a plurality of viewer terminals including a target person terminal. The comment art management system includes: a receiving unit that receives specifying information for specifying the target comment art from the target person terminal; a specifying unit configured to specify the target comment art from a plurality of registered comment art based on the specifying information by referring to a database storing the plurality of registered comment art, each of the plurality of registered comment art including a character string of a plurality of lines; and a display control unit configured to display the specified target comment art so as to be superimposed on the main content displayed on the plurality of viewer terminals.

With such an aspect, the target comment art is specified from a plurality of registered comment art preregistered in the database, and the target comment art is displayed. According to this mechanism, it is not necessary to create the target comment art when the main content is displayed; therefore, using the comment art (for example, displaying the comment art) is easy.

Effect of the Invention

According to one aspect of the present disclosure, use of comment art is facilitated.

EMBODIMENTS OF THE INVENTION

Figure 1:
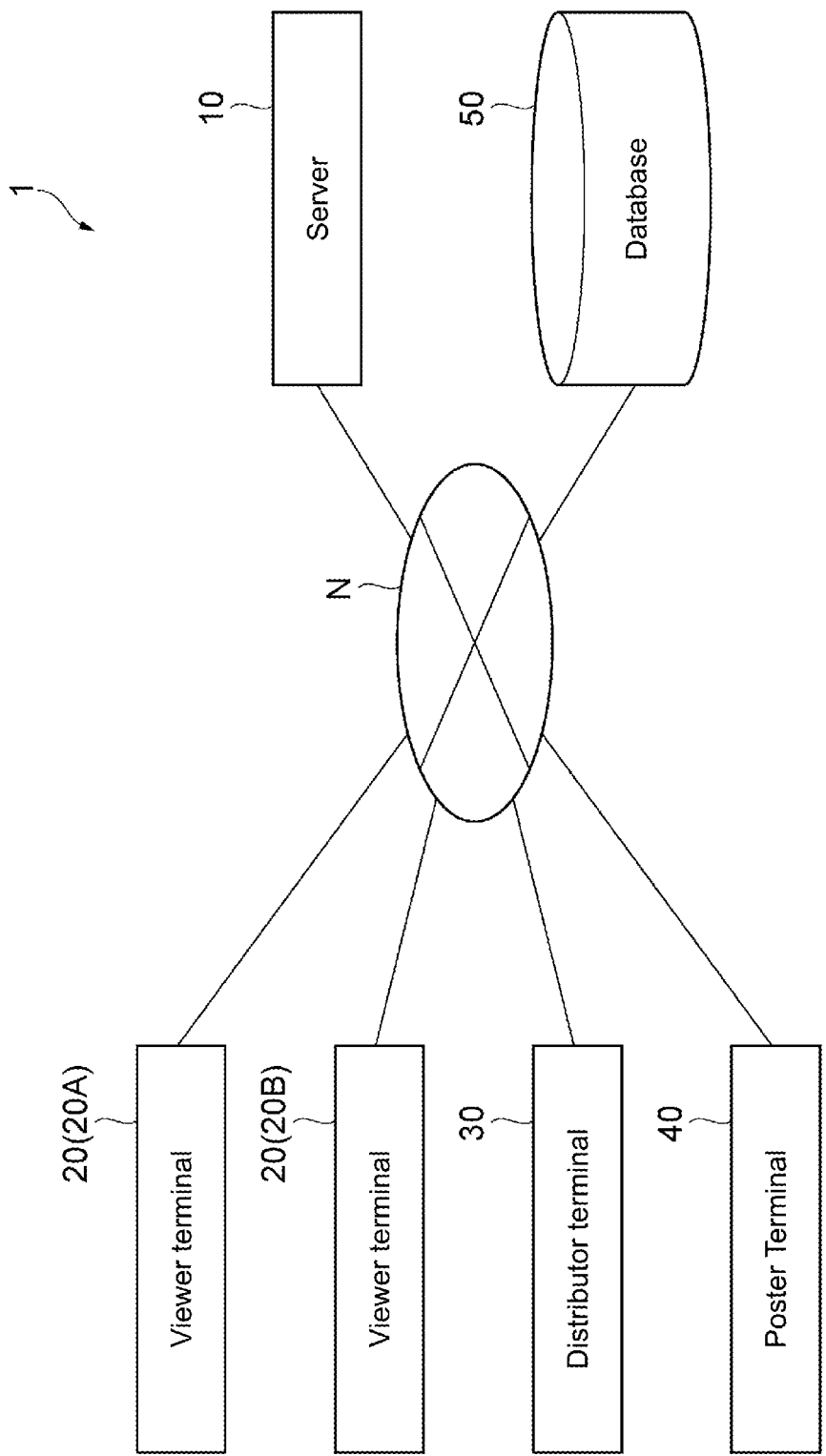
FIG. 1 illustrates an example of applying a comment art management system according to an embodiment.

Hereinafter, embodiments of the present disclosure will be described in detail with reference to the accompanying drawings. Note that in the description of the drawings, the same or equivalent elements are denoted by the same reference numerals, and redundant descriptions are omitted.

System Overview

A comment art management system according to an embodiment is a computer system that manages comment art. For example, the comment art management system displays the comment art superimposed on the main content displayed on a plurality of viewer terminals. The main content is information that is provided by a computer or a computer system and can be recognized by a person. The electronic data representing the main content is referred to as content data. The representation format of the main content is not limited, and the main content may be represented by an image (for example, a photograph or a video). The main content may be used for various types of information transmission or communication, and may be used for various scenes or purposes such as entertainment, news, education, medical care, games, chats, commercial transactions, lectures, seminars, training, and the like.

The comment art management system provides the main content to the viewer by transmitting the content data to the viewer terminal. The viewer is a person who tries to obtain information from the comment art management system, and is a user of the main content. In one example, the main content is provided by a distributor. The distributor is a person who intends to provide information by the comment art management system, and is a sender of the main content.

The method of providing the main content is not limited. For example, the comment art management system may distribute live content. In this case, the comment art management system generates content data by processing real-time video provided from a distributor terminal, and transmits the content data to the viewer terminal in real time. This is one aspect of live Internet broadcasting. Alternatively, the comment art management system may distribute video previously taken and generated.

The comment art is a design including a character string of at least one line. Typically, comment art includes a character string with a plurality of lines. The electronic data representing the comment art is referred to as comment art data. Comment art is one aspect of a comment displayed on the main content. The characters used in the comment art may be characters described by ASCII code, Unicode, or JIS code. The characters used in the comment art may be symbols, numbers, alphabets, kanji, hiragana, or katakana. The color of the characters is not limited and each character may have a different color. The character string having at least one line forming the comment art may represent one illustration or figure as a whole. The number of lines of the character string is not limited, as long as it is a plurality. The number of characters of each character string may be one or more, and the number of characters may be different for each character string. The comment art is displayed on the viewer terminal as a decoration of the main content, for example. The comment art management system can display comment art provided from a certain viewer terminal on another viewer terminal. Therefore, the viewer can view not only the comment art provided by the viewer, but also the comment art provided by another viewer, together with the main content.

The comment art management system displays the comment art superimposed on the main content. In the present disclosure, the phrase "displays the comment art superimposed on the main content" or an expression corresponding thereto refers to displaying the comment art superimposed on a portion or the whole of the main content.

The comment art management system displays comment art based on a request from a viewer. In the present disclosure, a viewer who requests display of comment art is referred to as a target person, and comment art that the target person desires to display is referred to as target comment art. The comment art data indicating the target comment art is referred to as target comment art data.

As an example, the comment art management system displays a target comment art selected by the target person from a plurality of comment art prepared in advance. In this case, first, the comment art management system extracts one or a plurality of comment art data from one or more comment art data stored in advance in a database, and displays comment art indicated by the extracted comment art data on the target person terminal in a selectable manner. The target person selects comment art (target comment art) that is desired to be displayed from the comment art displayed on the target person terminal. The comment art management system displays the selected target comment art superimposed on the main content. Herein, the comment art data stored in advance in the database is referred to as registered comment art data. The comment art indicated by the registered comment art data is referred to as registered comment art.

The comment art management system may register comment art provided by a user of the comment art management system in the database as registered comment art. Herein, the phrase "register comment art in the database" or an expression corresponding thereto means that the comment art data of the comment art to be registered is stored in the database. For example, the comment art management system acquires, from a terminal, comment art data of comment art created by a certain user on the terminal, and stores the acquired comment art data as registered comment art data. Providing the comment art to be registered on the comment art management system is referred to as "posting the comment art". A user who posts comment art is referred to as a poster, and comment art that has been posted is referred to as post comment art. The comment art data indicating post comment art is referred to as post comment art data. The poster may be the same person as the viewer or the distributor, or may be a different person.

System Configuration

FIG. 1 illustrates an example of applying a comment art management system 1 according to an embodiment. In one example, the comment art management system 1 includes at least a server 10, and may further include at least one of a viewer terminal 20, a distributor terminal 30, a poster terminal 40, and a database 50. The server 10 is a computer that provides content data and comment art data to the viewer terminal 20. The server 10 is connected to the viewer terminal 20, distributor terminal 30, poster terminal 40, and database 50 via a communication network N. The configuration of the communication network N is not limited. For example, the communication network N may be configured to include the Internet or may be configured to include an intranet.

The viewer terminal 20 is a computer used by a viewer. In one example, the viewer terminal 20 has a function of accessing the comment art management system 1 to receive and display content data. The type and configuration of the viewer terminal 20 are not limited. For example, the viewer terminal 20 may be a mobile terminal such as a high-performance mobile phone (smartphone), a tablet terminal, a wearable terminal (for example, a head mounted display (HMD), smart glasses, or the like), a laptop personal computer, a mobile phone, or the like. Alternatively, the viewer terminal 20 may be a stationary terminal such as a desktop personal computer or the like. The number of viewer terminals 20 is not limited, and may be one or more. In the present embodiment, the comment art management system 1 includes two viewer terminals 20. One of the viewer terminals 20 is a target person terminal 20A used by a target person, and the other viewer terminal 20 is another viewer terminal 20B used by a viewer other than the target person.

The distributor terminal 30 is a computer used by a distributor. In one example, the distributor terminal 30 has a function of capturing or generating a video, and a function of accessing the comment art management system 1 and transmitting electronic data (video data) indicating the video. The type and configuration of the distributor terminal 30 are not limited. For example, the distributor terminal 30 may be a photographing system having a function of photographing, recording, and transmitting a video. Alternatively, the distributor terminal 30 may be a mobile terminal such as a high-performance mobile phone (smartphone), a tablet terminal, a wearable terminal (for example, a head mounted display (HMD), smart glasses, or the like), a laptop personal computer, a mobile phone, or the like. Alternatively, the distributor terminal 30 may be a stationary terminal such as a desktop personal computer, or the like.

The poster terminal 40 is a computer used by a poster. In one example, the poster terminal 40 has a function of receiving an input of post comment art from a poster, and a function of accessing the comment art management system 1 and transmitting post comment art data. The type and configuration of the poster terminal 40 are not limited. For example, the viewer terminal 40 may be a mobile terminal such as a high-performance mobile phone (smartphone), a tablet terminal, a wearable terminal (for example, a head mounted display (HMD), smart glasses, or the like), a laptop personal computer, a mobile phone, or the like. Alternatively, the poster terminal 40 may be a stationary terminal such as a desktop personal computer.

The database 50 is a non-transitory storage device that stores data used by the comment art management system 1. In the present embodiment, the database 50 stores user information, registered comment art data, and content data. The user information is information related to a user (for example, a viewer, a distributor, or a poster) of the comment art management system 1. The user information may include an identifier of a user (user ID), an identifier of main content viewed by the user (content ID), the view count of the main content, a payment amount, a rank, an age, or a gender. The payment amount is an amount of money paid when the user uses the comment art management system 1. The rank may be an attribute of the user determined according to the payment amount.

The registered comment art data may include an identifier (comment art ID) of the registered comment art, a user ID of a poster, or a tag of the comment art. The tag of the comment art is a mark indicating information related to the comment art, and may indicate content or an attribute of the comment art. The content or attribute of the comment art may be a name of an illustration, a figure represented by the comment art, or a title of the comment art. For example, a tag "automobile" may be attached to a comment art representing a truck, and a tag "food" may be attached to a comment art representing an apple. The comment art management system 1 may extract comment art having a specific content or attribute from a plurality of comment art by using a tag. The tag may be assigned by the poster.

The content data may include a content ID of the main content, a user ID of a distributor, or a tag of the main content. The tag of the main content is a mark indicating information related to the main content, and may indicate details or attributes of the main content. The content or attribute of the main content may be a name of an object or person included in the main content, or a title of the main content. For example, a tag of "driving video" may be attached to main content that is video captured from a moving vehicle, and a tag of "meal video" may be attached to main content that is video captured from a meal scene. The comment art management system 1 may extract a main content having a specific content or attribute from a plurality of main content by using a tag. The tag may be assigned by the distributor.

The database 50 may be a single database or a set of a plurality of databases. The installation location of the database 50 is not limited. For example, the database 50 may be provided in a computer system different from the comment art management system 1.

Figure 2:
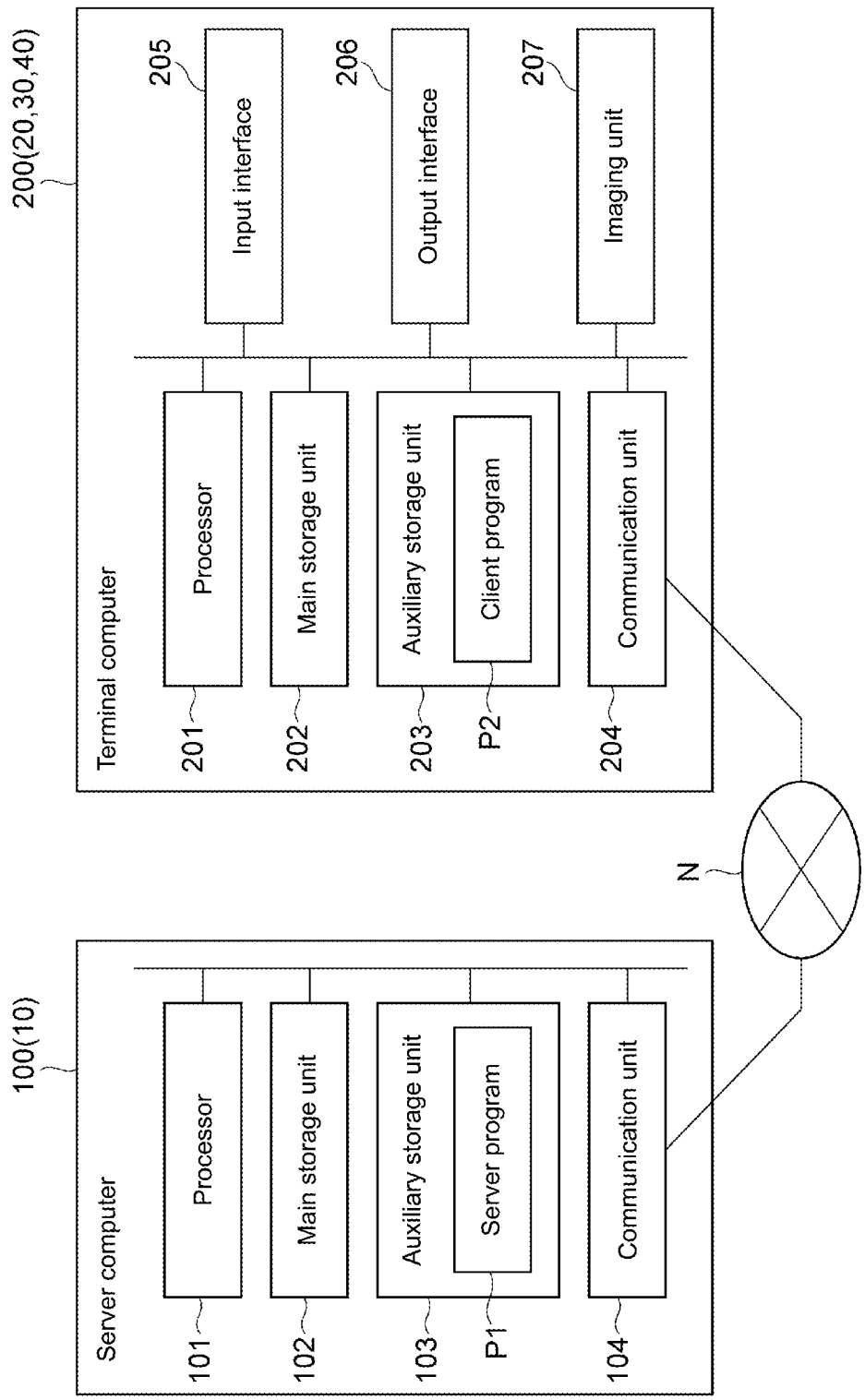
FIG. 2 illustrates an example of a hardware configuration associated with the comment art management system according to an embodiment.

FIG. 2 is a diagram illustrating an example of a hardware configuration associated with the comment art management system 1. FIG. 2 illustrates a server computer 100 functioning as the server 10, and a terminal computer 200 functioning as the viewer terminal 20, the distributor terminal 30, or the poster terminal 40.

As an example, the server computer 100 includes a processor 101, a main storage unit 102, an auxiliary storage unit 103, and a communication unit 104 as hardware components. The processor 101 is a calculating device that executes an operating system and an application program, and is, for example, a central processing unit (CPU) or a graphic processing unit (GPU). The main storage unit 102 is a device that stores a program to be executed, calculation results, and the like, and is configured by, for example, read only memory (ROM) or random access memory (RAM). The auxiliary storage unit 103 is generally a device capable of storing a larger amount of data than the main storage unit 102, and is configured by a nonvolatile storage medium such as a hard disk or a flash memory. The auxiliary storage unit 103 stores a server program P1 for causing the server computer 100 to function as the server 10 as well as various data. The communication unit 104 is a device that executes data communication with another computer via the communication network N, and is configured by, for example, a network card or a wireless communication module.

In the present embodiment, the comment art management program is implemented as a server program P1. The functional elements of the server 10 are implemented by causing the processor 101 or the main storage unit 102 to read a server program P1 and causing the processor 101 to execute the program. The server program P1 includes a code for achieving the functional elements of the server 10. The processor 101 causes the communication unit 104 to operate in accordance with the server program P1, and executes reading and writing of data in the main storage unit 102 or the auxiliary storage unit 103. Each functional element of the server 10 is achieved by such processing.

The server 10 may be configured by one or more computers. When a plurality of computers are used, these computers are connected to each other via the communication network N to logically configure one server 10.

As an example, the terminal computer 200 includes a processor 201, a main storage unit 202, an auxiliary storage unit 203, a communication unit 204, an input interface 205, an output interface 206, and an imaging unit 207 as hardware components. The processor 201 is a calculating device that executes an operating system and an application program, and is, for example, a CPU or a GPU. The main storage unit 202 is a device that stores a program to be executed, calculation results, and the like, and is configured by, for example, ROM or RAM. The auxiliary storage unit 203 is generally a device capable of storing a larger amount of data than the main storage unit 202, and is configured by a nonvolatile storage medium such as a hard disk or a flash memory. The auxiliary storage unit 203 stores a client program P2 for causing the computer 200 to function as the viewer terminal 20, the distributor terminal 30, or the poster terminal 40, as well as various data. The communication unit 204 is a device that executes data communication with another computer via the communication network N, and is configured by, for example, a network card or a wireless communication module. The input interface 205 is a device that receives data based on a user's operation or action, and includes, for example, at least one of a keyboard, an operation button, a pointing device, a touch panel, a microphone, a sensor, and a camera. The output interface 206 is a device that outputs data processed by the terminal computer 200, and includes, for example, a display device such as a monitor, a touch panel, or an HMD. The imaging unit 207 is a device that captures an image (video or photograph) of the real world, and is, for example, a camera. The imaging unit 207 may also serve as the input interface 205.

The functional elements of the viewer terminal 20, the distributor terminal 30, and the poster terminal 40 are achieved by causing the processor 201 or the main storage unit 202 to read the client program P2 and causing the processor 201 to execute the program. The client program P2 includes code for achieving the functional elements of the viewer terminal 20, the distributor terminal 30, or the poster terminal 40. The processor 201 operates the communication unit 204, the input interface 205S, the output interface 206S, or the imaging unit 207 so as to read and write data from and to the main storage unit 202 or the auxiliary storage unit 203 in accordance with the client program P2. By this processing, each functional element of the viewer terminal 20, the distributor terminal 30, or the poster terminal 40 is achieved.

At least one of the server program P1 and the client program P2 may be provided by being non-temporarily recorded on tangible recording media such as a compact disc read only memory ("CD-ROM"), a digital video disc read only memory ("DVD-ROM"), or a semiconductor memory. Alternatively, at least one of the programs may be provided via the communication network N as a data signal superimposed on a carrier wave. The programs may be provided separately, or may be provided together.

Figure 3:
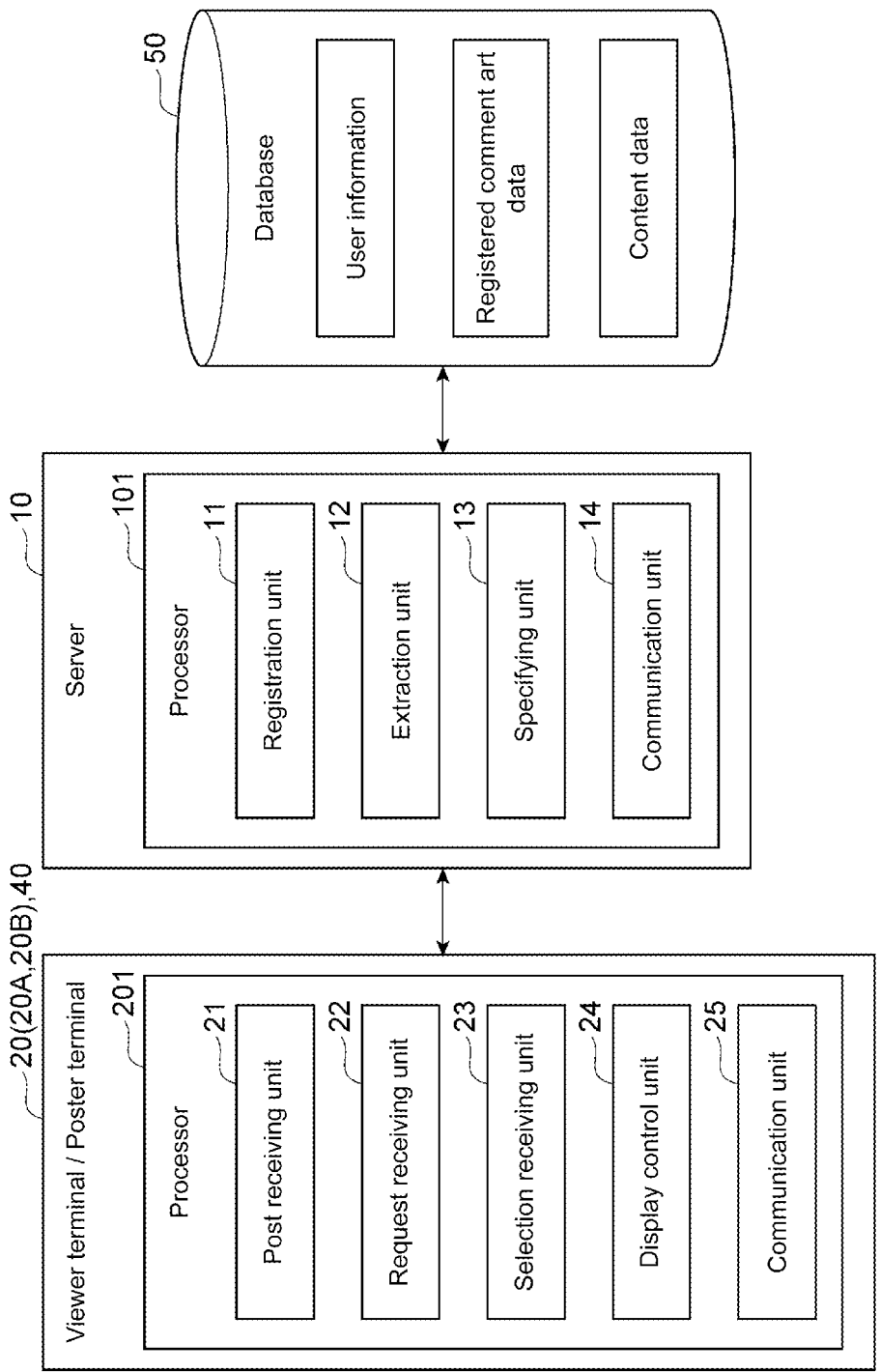
FIG. 3 illustrates an example of a functional configuration associated with the comment art management system according to an embodiment.

FIG. 3 illustrates an example of a functional configuration associated with the comment art management system 1. In one example, the viewer terminal 20 and the poster terminal 40 include similar functional elements. Therefore, one terminal may exhibit the function of at least one of the viewer terminal 20 and the poster terminal 40. Therefore, both terminals are illustrated as one terminal in FIG. 3. The viewer terminal 20 and the poster terminal 40 may be different terminals.

The server 10 includes a registration unit 11, an extraction unit 12, a specifying unit 13, and a communication unit 14. The registration unit 11 is a functional element that registers the post comment art in the database 50. The extraction unit 12 is a functional element that extracts candidates of target comment art from the registered comment art based on a request from the target person terminal 20A. The specifying unit 13 is a functional element that specifies the target comment art based on the specifying information from the target person terminal 20A. The communication unit 14 is a functional element that transmits and receives various types of data to and from the viewer terminal 20, the poster terminal 40, and the database 50. That is, the communication unit 14 functions as a transmission unit and a receiving unit.

The viewer terminal 20 and the poster terminal 40 include a post receiving unit 21, a request receiving unit 22, a selection receiving unit 23, a display control unit 24, and a communication unit 25. The post receiving unit 21 is a functional element that receives an input of post comment art from a poster. The request receiving unit 22 is a functional element that receives various requests from the poster. The selection receiving unit 23 is a functional element that receives a selection of the target comment art from the target person. The display control unit 24 is a functional element that processes the content data and the comment art data and displays the main content and the comment art on the viewer terminal. The communication unit 25 is a functional element that transmits and receives various data to and from the server 10. That is, the communication unit 25 functions as a transmission unit and a receiving unit.

System Operation

Figure 4:
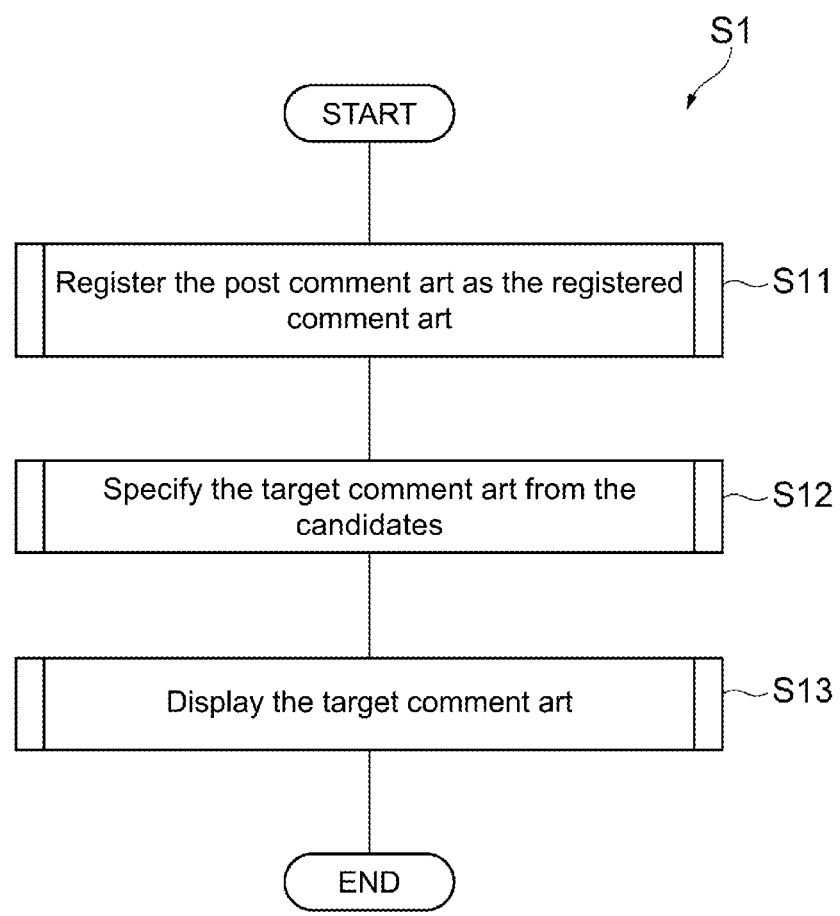
FIG. 4 is a flowchart showing an example of the operation of the comment art management system according to an embodiment.

Operation of the comment art management system 1 will be described, and a comment art management method according to the present embodiment will be described. First, an overview of processing performed by the comment art management system 1 will be described with reference to FIG. 4. FIG. 4 is a flowchart showing the operation of the comment art management system 1 as a processing flow 51. Processing by the comment art management system 1 is roughly divided into a registering process (step S11) of registering post comment art as registered comment art, a specifying process (step S12) of specifying target comment art selected by a target person, and a displaying process (step S13) of displaying the target comment art.

In step S11, the registration unit 11 registers the post comment art as registered comment art in the database 50. In other words, the registration unit 11 stores the post comment art data in the database 50 as the registered comment art data. The method of acquiring the post comment art data is not limited. For example, first, the post receiving unit 21 receives input of post comment art from a poster. The poster may input the post comment art using the input interface 205 of the poster terminal 40. The post receiving unit 21 outputs post comment art data indicating the input post comment art to the communication unit 25. The communication unit 25 transmits the post comment art data to the communication unit 14. The registration unit 11 acquires the post comment art data received by the communication unit 14.

11 may store the data including the comment art ID of the registered comment art, the user ID of the poster, and the tag of the registered comment art, in the database 50. The registration unit 11 may use the tag of the post comment art assigned by the poster without modification as the tag of the registered comment art, or may newly assign a different tag.

In step S12, the specifying unit 13 specifies the target comment art. In the present embodiment, the comment art management system 1 extracts one or more registered comment art from a plurality of registered comment art registered in the database 50, and displays the registered comment art on the target person terminal 20A in a selectable manner. The target person selects comment art (target comment art) to be displayed from the registered comment art on display. In other words, the registered comment art displayed on the target person terminal 20A in a selectable manner is a candidate for the target comment art. The specifying unit 13 specifies the target comment art selected by the target person from the candidates. The process in step S12 corresponds to the specifying process.

The specifying unit 13 specifies the target comment art based on the specifying information. The specifying information is information for specifying the target comment art. The specifying information may be, for example, comment art ID of the target comment art. After the specifying has been performed by the specifying unit 13, the target comment art data indicating the target comment art is transmitted from the communication unit 14 to the communication unit 25.

In step S13, the display control unit 24 displays the target comment art. The display control unit 24 processes the target comment art data acquired from the communication unit 25 and causes the display device to display the target comment art superimposed on the main content.

The above-described specifying process (step S12) may be executed at a certain time interval (for example, several hours or several days) after completion of the registering process (step S11). That is, the specifying process might not be executed continuously with the registering process. The displaying process (step S13) is normally executed continuously after the specifying process is completed, but is not necessarily executed continuously after the specifying process.

Figure 5:
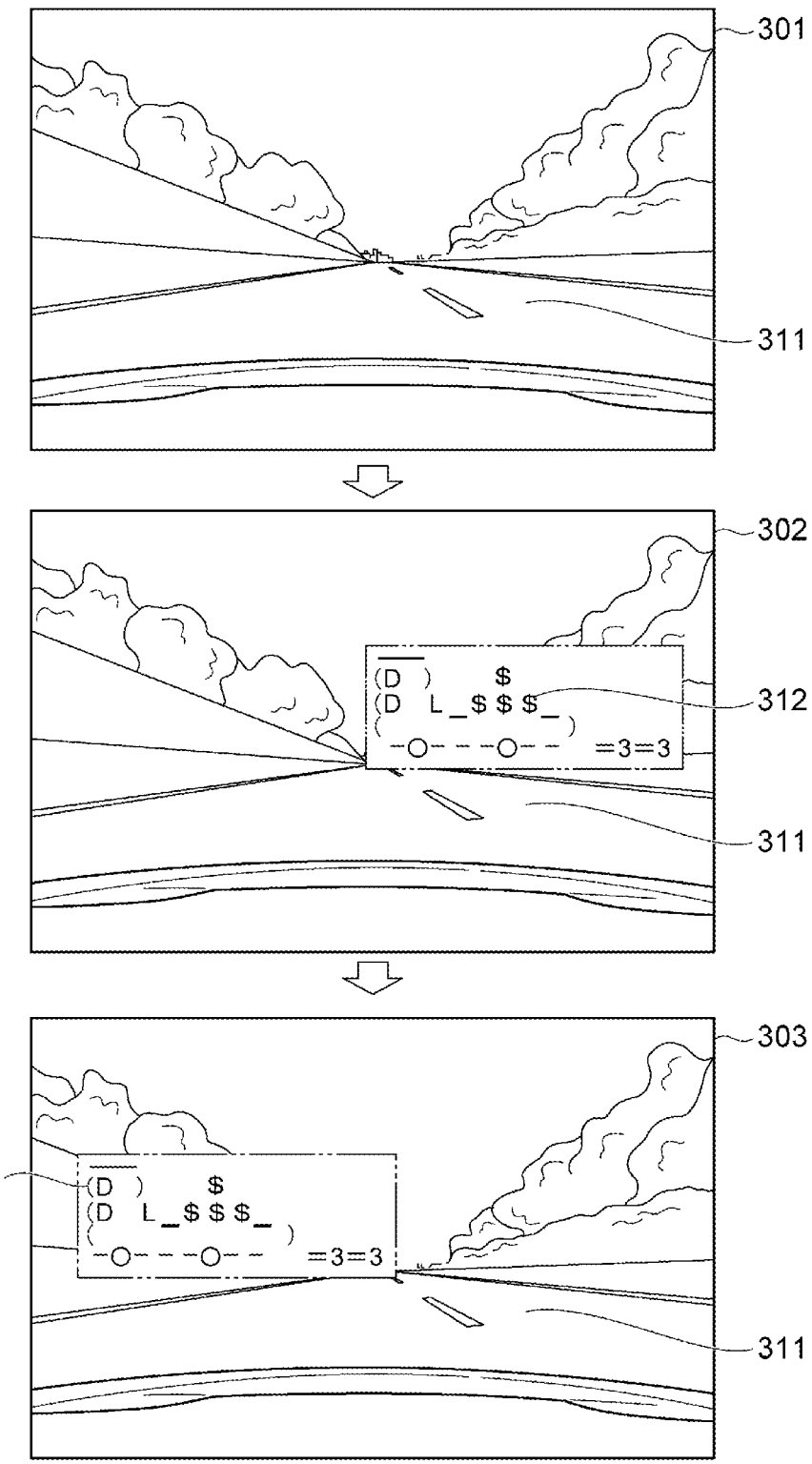
FIG. 5 illustrates an example of a screen displayed on a viewer terminal.

A display method of the target comment art will be described with reference to FIG. 5. The "display method of the target comment art" refers to a method related to the visual effect of the target comment art (that is, a method related to how to show the target comment art). FIG. 5 illustrates an example of a screen displayed on the viewer terminal 20. In this example, the display control unit 24 displays a video of scenery (road or the like) seen from the inside of the vehicle on the viewer terminal 20 as the main content 311, and changes the display in the order of screen 301, 302, and 303.

First, the display control unit 24 processes the content data and displays the main content 311. The display at this time corresponds to screen 301.

After that, the display control unit 24 processes the target comment art data and displays the target comment art superimposed on the main content. The display at this time corresponds to screen 302. Screen 302 includes target comment art 312 displayed superimposed on the right region of the main content 311. The target comment art 312 represents a truck. The target comment art 312 includes a character string of five lines. The number of characters of each character string is different.

In one example, the display control unit 24 displays the target comment art 312 in a manner that moves in a predetermined direction with respect to the main content 311. In this case, the target comment art 312 is visually recognized by the viewer as flowing on the main content 311 in a predetermined direction. For example, the display control unit 24 displays the target comment art 312 in a manner that moves from the right side to the left side of the main content 311. The display at this time corresponds to screen 303. On screen 303, the target comment art 312 is displayed superimposed on the left region of the main content 311. The moving speed of the target comment art 312 may be adjusted according to the size of the target comment art 312. For example, the display control unit 24 may display the target comment art 312 so as to move faster based on the size of the target comment art as compared to the main content 311. The display method of the target comment art 312 is not limited. For example, the comment art management system 1 may display the target comment art 312 so as to stop, blink, or rotate. The comment art management system 1 may simultaneously display a plurality of target comment art 312 on the screen.

As illustrated in the example of FIG. 5, the display control unit 24 does not necessarily display the main content 311 in the rectangular region surrounding the target comment art 312. The rectangular region may be, for example, a circumscribed rectangle of the target comment art 312. In FIG. 3, the rectangular region is indicated by a two dot chain line. The two dot chain line is a virtual line shown for description and is not displayed on the actual screen. As described above, the display control unit 24 does not necessarily display the main content 311 in the predetermined region surrounding the target comment art 312. The display method of the main content 311 is not limited. The display control unit 24 may also display the main content 311 in a predetermined region surrounding the target comment art 312. In this case, the display control unit 24 may make each character transparent so that the main content 311 can be visually recognized through each character constituting the target comment art 312. The display control unit 24 may display a plurality of layers each including the target comment art in an overlapping manner. At this time, the display control unit 24 may cause the target comment art to be displayed as animation by adjusting the display timing of each layer by shifting or the like. Alternatively, the display control unit 24 may display the target comment art as an animation by continuously displaying (frame-by-frame display) different target comment art without overlapping each other.

Figure 6:
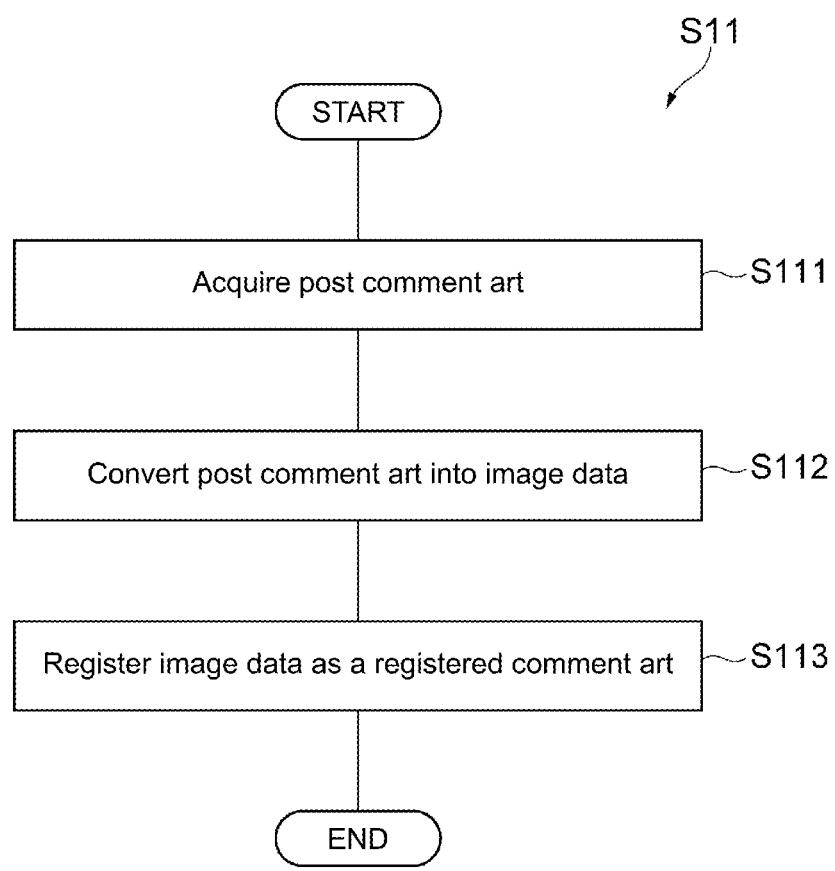
FIG. 6 is a flowchart showing an example of the operation of the comment art management system according to an embodiment.

The registering process of post comment art performed by the comment art management system 1 will be described in detail with reference to FIG. 6. FIG. 6 is a flowchart showing details of the registering process (step S11).

In step S111, the registration unit 11 acquires the post comment art. Specifically, the registration unit 11 acquires post comment art data from the poster terminal 40. In one example, the post receiving unit 21 generates post comment art data. For example, the post receiving unit 21 receives an input of post comment art via the input interface 205, and acquires text data of a plurality of characters constituting the post comment art as post comment art data. The text data is data including an arrangement of a plurality of characters described by character codes, and is different from the image data described later. The post receiving unit 21 outputs the post comment art data to the communication unit 25. The communication unit 14 receives the post comment art data from the communication unit 25 and outputs the post comment art data to the registration unit 11. The post comment art data may include a user ID of the poster or a tag of the post comment art.

In step S112, the registration unit 11 converts the post comment art into image data. Specifically, the registration unit 11 converts the post comment art data acquired as text data into image data. The image data is data including a set of a plurality of pixels. The information of each pixel may be represented by, for example, a base-16 number. The registration unit 11 converts the post comment art data into image data while maintaining the order, position, size, and interval of a plurality of characters forming the post comment art. That is, the registration unit 11 executes the conversion so that the appearance of the post comment art is maintained.

In step S113, the registration unit 11 registers the image data as registered comment art. Specifically, the registration unit 11 stores the image data as registered comment art data in the database 50. The registration unit 11 may compress the image data to a predetermined data size in accordance with the method of the post comment art and then store the image data in the database 50.

The registering process by the comment art management system 1 is not limited to the aforementioned content. For example, in the process of acquiring the target comment art (step S111), the registration unit 11 may acquire image data from the poster terminals 40. In this case, the registration unit 11 generates the post comment art from the acquired image data. For example, the registration unit 11 may divide the post comment art by dividing the image indicated by the acquired image data into a plurality of blocks and replacing the image included in each block with a similar character to generate post comment art.

The process (step S12) of converting the comment art into the image data may be omitted. In this case, the registration unit 11 stores the post comment art data in the database 50 as text data.

The registration unit 11 may register the registered comment art by a method in which users of the comment art management system 1 including the poster cannot modify the registered comment art, or may register the registered comment art by a method in which a predetermined user (for example, only the poster) can modify the registered comment art. The registration unit 11 may determine the possibility of modification and the range of users to which modification is possible based on an instruction from the poster (instruction data from the poster terminal 40).

When the post comment art data exists on the Internet, the post receiving unit 21 may receive an input of a uniform resource locator ("URL") of a location where the post comment art data exists. The registration unit 11 may register the URL or post comment art data obtained by accessing the URL as the registered comment art data.

Figure 7:
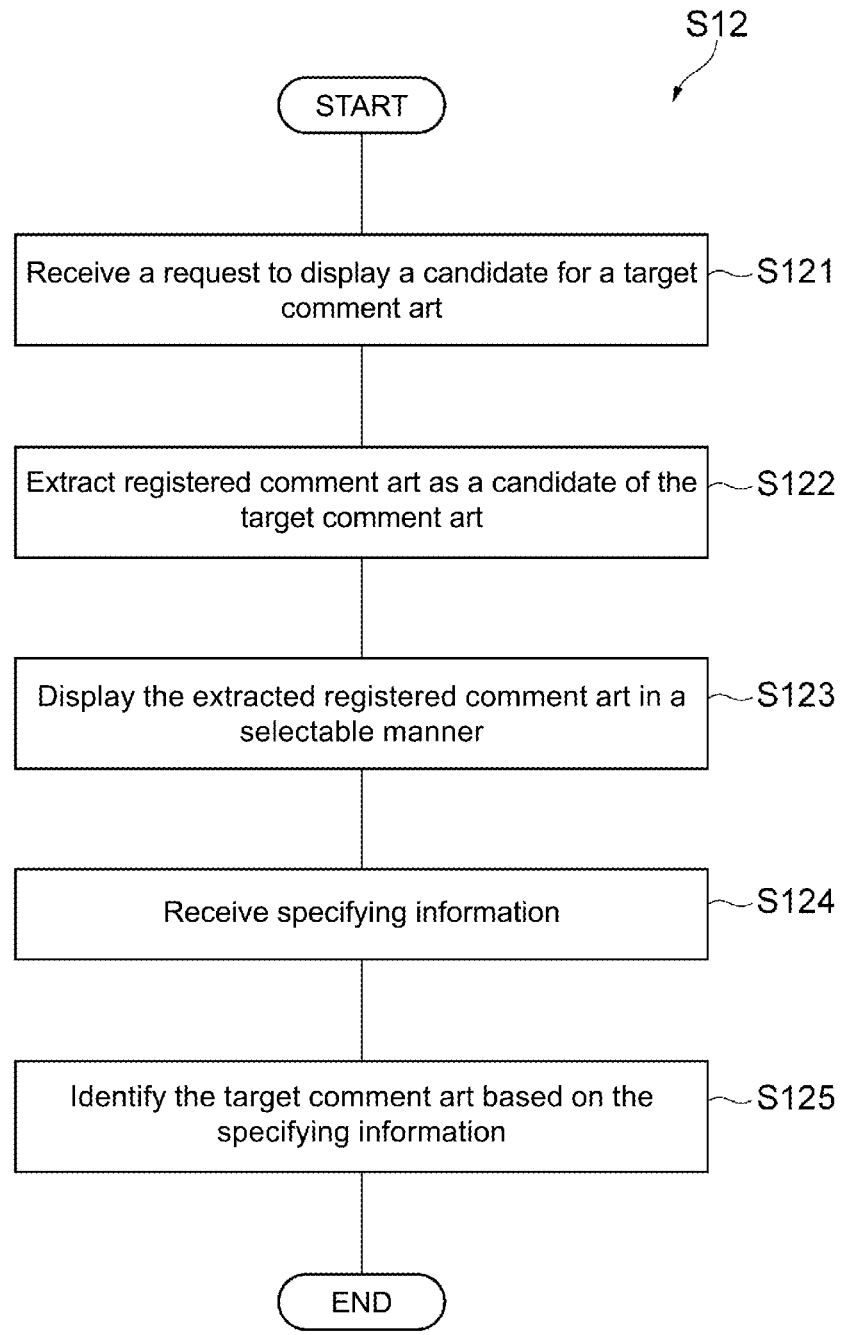
FIG. 7 is a flowchart showing an example of the operation of the comment art management system according to an embodiment.

Details of the specifying process for specifying the target comment art performed by the comment art management system 1 will be described with reference to FIG. 7. FIG. 7 is a flowchart showing details of the specifying process (step S12). As an example, a case will be described in which the comment art management system 1 displays candidates of target comment art on the target person terminal 20A in a selectable manner, and displays the target comment art selected by the target person on the viewer terminal 20.

In step S121, the communication unit 14 receives the display request of the candidate target comment art from the communication unit 25. Hereinafter, the display request for the candidate target comment art is referred to as a candidate display request. The candidate display request is a signal for displaying candidates of the target comment art on the target person terminal 20A. The candidate display request may be generated by the request receiving unit 22. For example, the request receiving unit 22 may generate the candidate display request when receiving a predetermined process from the target person via the input interface 205. The predetermined process includes the target person selecting an icon of "display candidate comment art" to be displayed on the target person terminal 20A.

In step S122, the extraction unit 12 extracts registered comment art that is a candidate for the target comment art from among a plurality of registered comment art registered in the database 50. The extraction unit 12 may extract one or more registered comment art. The extraction unit 12 may extract the registered comment art in accordance with the content of the main content. In this case, the extraction unit 12 may estimate the content of the main content based on the tag attached to the main content. For example, when the tag of the main content is "driving video", the extraction unit 12 may extract the registered comment art to which a tag of "automobile" is attached. The extraction unit 12 may analyze voice and text included in the main content and estimate the content of the main content.

A method of extraction by the extraction unit 12 is not limited. For example, the extraction unit 12 may extract the registered comment art based on the content of other comment art already displayed on the main content. Specifically, the extraction unit 12 may extract registered comment art having content similar to other comment art that has already been displayed. The extraction unit 12 may extract the registered comment art previously selected by the target person as the target comment art. The extraction unit 12 may extract the registered comment art based on the user information (for example, age or gender) of the target person.

In step S123, the display control unit 24 displays the extracted registered comment art on the target person terminal 20A in a selectable manner. For example, the display control unit 24 displays a list of the extracted registered comment art. When the registered comment art data includes the user ID of the poster and the tag of the registered comment art, the display control unit 24 may display these pieces of information together. The target person selects a registered comment art (target comment art) to be displayed from among the displayed registered comment art.

The display control unit 24 may cause at least a portion of the extracted registered comment art to be displayed in a conditionally selectable manner. For example, the display control unit 24 may display a portion of the registered comment art in a manner in which the portion of the registered comment art cannot be selected unless the poster of the registered comment art gives permission.

In step S124, the communication unit 14 receives the specifying information from the communication unit 25. The specifying information is generated by the selection receiving unit 23. The selection receiving unit 23 may use the comment art ID of the target comment art selected by the target person as the specifying information. When the selection receiving unit 23 receives the selection of the target comment art, the selection receiving unit 23 generates the specifying information. Selection of the target comment art includes selecting the target comment art using an input interface 205 such as a mouse.

In step S125, the specifying unit 13 specifies the target comment art based on the specifying information. When the specifying information includes the comment art ID, the specifying unit 13 specifies the registered comment art having the comment art ID as the target comment art.

The specifying process by the comment art management system 1 is not limited to the aforementioned content. Although the target person selects the target comment art in the aforementioned specifying process, the specifying unit 13 of the comment art management system 1 may perform the selecting process of the target comment art. In this case, the specifying unit 13 may select the target comment art in accordance with the content of the main content. For example, when the tag of the displayed main content is "meal video", the specifying unit 13 may select a registered comment art to which the tag of "food" is assigned as the target comment art. When the specifying unit 13 performs the process of selecting the target comment art, the selecting process also serves as the process of specifying the target comment art (step S125). Thus, when the selecting process is terminated, the specifying process is also terminated. In this case, the specifying information may be a signal (selection request) for causing the comment art management system 1 to start the selecting process of the target comment art. The selection request may be generated by the request receiving unit 22. For example, the request receiving unit 22 may generate the selection request when receiving a predetermined process from the target person via the input interface 205. The predetermined process may be such that the target person selects an icon of "automatic selection of comment art" displayed on the target person terminal 20A.

Figure 8:
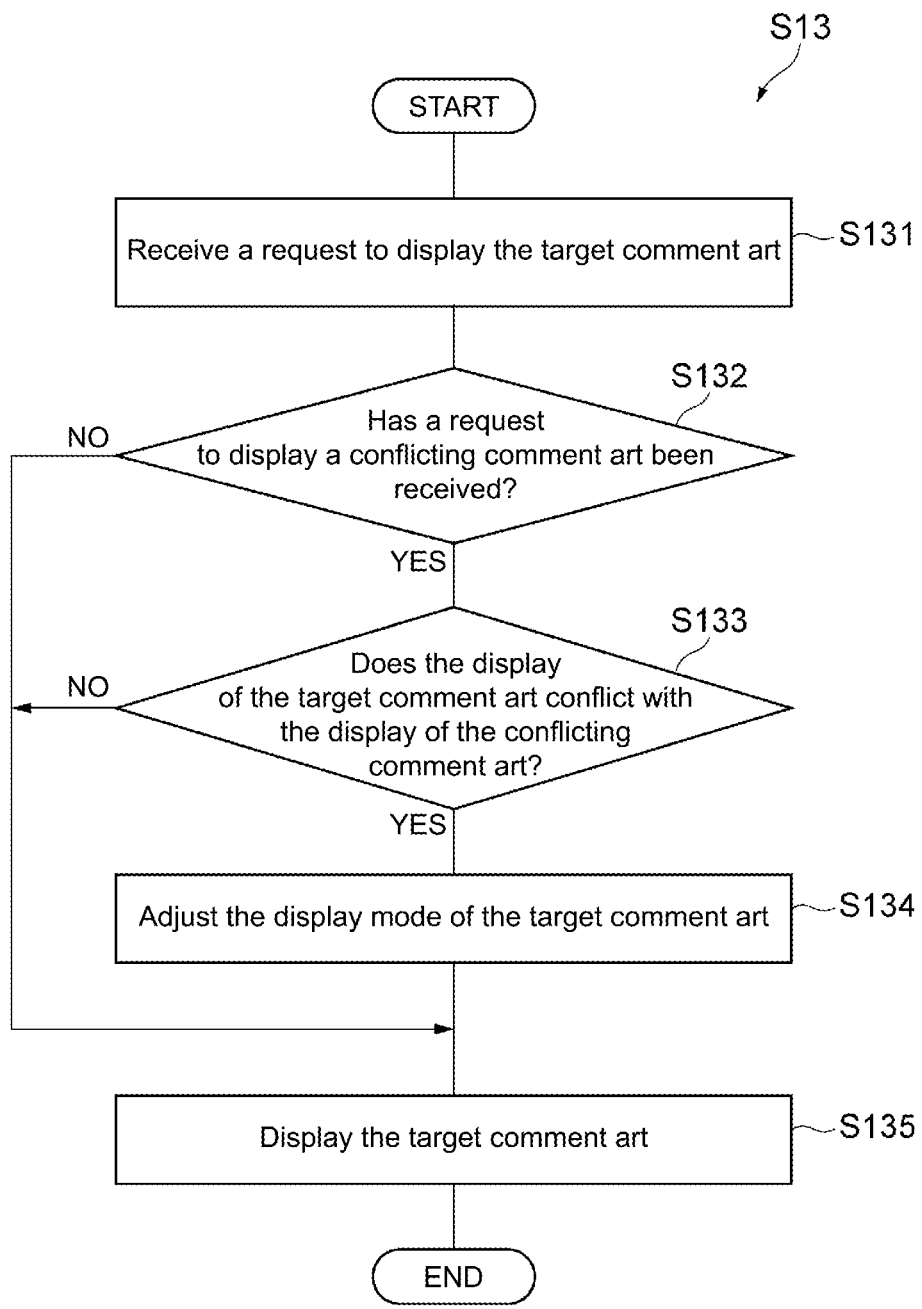
FIG. 8 is a flowchart showing an example of the operation of the comment art management system according to an embodiment.

The displaying process of the target comment art performed by the comment art management system 1 will be described in detail with reference to FIG. 8. FIG. 8 is a flowchart showing the details of the displaying process (step S13).

In step S131, the communication unit 14 receives a display request for the target comment art from the communication unit 25. The display request of the target comment art is a signal for displaying the target comment art on the viewer terminal 20. The display request for the target comment art may be generated by the request receiving unit 22. For example, the request receiving unit 22 may generate the display request of the target comment art when receiving a predetermined process from the target person via the input interface 205. The predetermined process may be such that the target person selects an icon of "display comment art" displayed on the target person terminal 20A.

In step S132, it is determined whether or not the communication unit 14 has received a request to display conflicting comment art. Conflicting comment art is comment art requested to be displayed by another viewer terminal 20B. The request to display conflicting comment art is a signal for displaying the conflicting comment art on the viewer terminal 20. For example, when the communication unit 14 receives a request to display conflicting comment art from the other viewer terminal 20B, the display control unit 24 displays the conflicting comment art superimposed on the main content displayed on the viewer terminal 20. When the communication unit 14 receives a request to display conflicting comment art, the process proceeds to step S133. When the communication unit 14 has not received the request to display the conflicting comment art, the process proceeds to step S135.

In step S133, the display control unit 24 determines whether or not the display of the target comment art and the display of the conflicting comment art conflict with each other. The display of the target comment art and the display of the conflicting comment art conflicting with each other means that the target comment art overlaps all or a portion of the conflicting comment art when the display control unit 24 displays the target comment art and the conflicting comment art. If the display of the target comment art and the display of the conflicting comment art conflict with each other, the process proceeds to step S134. When the display of the target comment art and the display of the conflicting comment art do not conflict with each other, the process proceeds to step S135.

In step S134, the display control unit 24 adjusts the display method of the target comment art. This adjustment is a process of avoiding conflict or reducing the degree of the conflict between the display of the target comment art and the display of the conflicting comment art. The technique of adjusting the display method is not limited. The display control unit 24 may adjust the size, the display position, or the display timing of the target comment art. Specifically, the display control unit 24 may display the target comment art as a smaller size. The display control unit 24 may separate the display position of the target comment art from the display position of the conflicting comment art. The display control unit 24 may adjust the timing of displaying the target comment art so as to be different from the timing of displaying the conflicting comment art.

The display control unit 24 may adjust the display method of the target comment art based on the relationship between the target person and the distributor. For example, the display control unit 24 may specify how many times the target person views the main content distributed by the distributor, and may display the target comment art in a smaller size when the view count is smaller. The display control unit 24 may specify the view count by referring to the database 50. The display control unit 24 may compare the view count by the target person with the view count of other viewers, and may display the comment art of a person having a smaller view count in a smaller size.

The display control unit 24 may adjust the display method of the target comment art based on the payment amount of the target person or the rank of the target person. For example, the display control unit 24 may specify a payment amount or a rank of the target person, and may display the target comment art in a smaller size as the payment amount or the rank is lower. The display control unit 24 may specify the payment amount or the rank by referring to the database 50. The display control unit 24 may compare the payment amount or the rank of the target person with the payment amount or the rank of each of the other viewers, and may display the comment art associated with a lower payment amount or rank in a smaller size.

In the target person terminal 20A, the display control unit 24 may display the target comment art without displaying the conflicting comment art on the target person terminal 20A. Alternatively, in another viewer terminal 20B, the display control unit 24 may display the conflicting comment art without displaying the target comment art on the other viewer terminal 20B.

In step S135, the display control unit 24 displays the target comment art superimposed on the main content. When the adjusting process of the display method of the target comment art is performed in step S134, the display control unit 24 displays the target comment art based on the results of the adjustment. For example, the display control unit 24 displays the target comment art to be smaller than the conflicting comment art.

The display control unit 24 may adjust the size of the target comment art by changing the number of lines of the character strings constituting the target comment art or the number of characters of each character string. In order to adjust the size of the target comment while maintaining the shape of the illustration or the figure indicated by the target comment art, the display control unit 24 may change the number of blank characters included in the target comment art or may replace some of the characters included in the target comment art with other characters.

The displaying process by the comment art management system 1 is not limited to the aforementioned content. In the aforementioned displaying process, when the display of the target comment art and the display of the conflicting comment art conflict with each other, the display control unit 24 adjusts the display method of the target comment art. However, even when the display of the target comment art and the display of the conflicting comment art do not conflict with each other, the display control unit 24 may adjust the display method of the target comment art. The display control unit 24 may adjust the display method of the conflicting comment art without adjusting the display method of the target comment art.

Figure 9:
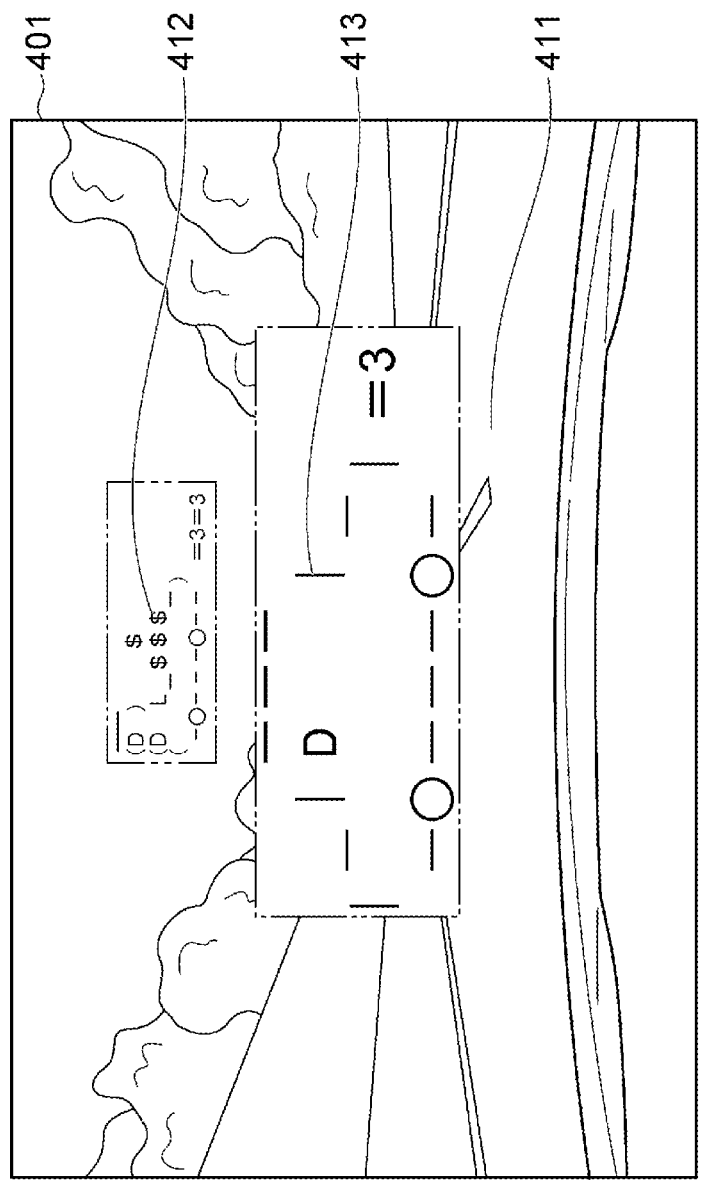
FIG. 9 illustrates an example of a screen displayed on a viewer terminal.

The display method of the target comment art and the conflicting comment art will be described with reference to FIG. 9. FIG. 9 illustrates an example of a screen displayed on the viewer terminal 20. In the example of FIG. 9, the display control unit 24 displays the target comment art 412 and the conflicting comment art 413 superimposed on the main content 411. The display at this time corresponds to screen 401.

The screen 401 includes main content 411, target comment art 412, and conflicting comment art 413. The main content 411 is a video of scenery (such as a road) seen from the inside of a vehicle. The target comment art 412 represents a truck and the conflicting comment art 413 represents a passenger car.

The display control unit 24 displays the target comment art 412 and the conflicting comment art 413 so as to move from the right side to the left side of the main content 411. In this example, the display control unit 24 displays the target comment art 412 so as to pass through the upper region of the main content 411, and displays the conflicting comment art 413 so as to pass through the central region of the main content 411. The display control unit 24 displays the target comment art 412 smaller than the conflicting comment art 413. By this process, the target comment art 412 is displayed so as to not overlap the conflicting comment art 413.

In the example of FIG. 9, the display control unit 24 adjusts the display method of the target comment art 412. If such an adjustment is not performed, each comment art will be displayed according to the initial setting, and therefore there is a possibility that a portion or all of the target comment art 412 will be displayed so as to overlap the conflicting comment art 413. In the example of FIG. 9, the display control unit 24 causes the target comment art 412 to be displayed smaller than the conflicting comment art 413 and at a position different from the display position of the conflicting comment art 413. Thus, conflict between the display of the target comment art 412 and the display of the conflicting comment art 413 is avoided.

Effect

As described above, the comment art management system according to one aspect of the present disclosure is a comment art management system that causes the target comment art containing a character string of a plurality of lines to be displayed on a plurality of viewer terminals including a target person terminal. The comment art management system includes a receiving unit (communication unit) that receives specifying information for specifying a target comment art from a target person terminal, a specifying unit that specifies the target comment art from among a plurality of registered comment art based on the specifying information by referring to a database that stores a plurality of registered comment art each including a character string of a plurality of lines, and a display control unit that displays the specified target comment art superimposed on the main content displayed on a plurality of viewer terminals.

The comment art management method according to one aspect of the present disclosure is executed by a comment art management system including a processor configured to cause a plurality of viewer terminals including a target person terminal to display target comment art containing a plurality of lines of character strings. The comment art management method includes: a step of receiving specifying information for specifying the target comment art from the target person terminal; a step of specifying the target comment art from a plurality of registered comment art based on the specifying information by referring to a database storing the plurality of registered comment art, each of the plurality of registered comment art including a character string of a plurality of lines; and a step of displaying the specified target comment art so as to be superimposed on the main content displayed on the plurality of viewer terminals.

A comment art management program according to one aspect of the present disclosure causes a computer to function as a comment art management system that causes a plurality of viewer terminals including a target person terminal to display the target comment art including a plurality of lines of character strings on a plurality of viewer terminals including a target person terminal. The comment art management program causes a computer to perform: a step of receiving specifying information for specifying the target comment art from the target person terminal; a step of specifying the target comment art from a plurality of registered comment art based on the specifying information by referring to a database storing the plurality of registered comment art, each of the plurality of registered comment art including a character string of a plurality of lines; and a step of displaying the specified target comment art so as to be superimposed on the main content displayed on the plurality of viewer terminals.

A computer-readable recording medium according to one aspect of the present disclosure stores a comment art management program that causes a computer to function as a comment art management system that displays a target comment art including a character string of a plurality of lines on a plurality of viewer terminals including a target person terminal. The comment art management program causes a computer to perform: a step of receiving specifying information for specifying the target comment art from the target person terminal; a step of specifying the target comment art from a plurality of registered comment art based on the specifying information by referring to a database storing the plurality of registered comment art, each of the plurality of registered comment art including a character string of a plurality of lines; and a step of displaying the specified target comment art so as to be superimposed on the main content displayed on the plurality of viewer terminals.

With such an aspect, the target comment art is specified from a plurality of registered comment art preregistered in the database, and the target comment art is displayed. According to this mechanism, it is not necessary to create the target comment art when the main content is displayed, and therefore using the comment art (for example, displaying the comment art) is easy.

In the comment art management system according to another aspect, the display control unit may display at least one of the plurality of registered comment art on the target person terminal in a selectable manner when the receiving unit receives a display request (candidate display request) for the registered comment art. The specifying unit may specify the registered comment art selected on the target person terminal as the target comment art. In this case, the registered comment art that is a candidate for the target comment art is displayed on the target person terminal. Accordingly, the target person can actually visually recognize and select the comment art desired to be displayed, and thus selection of the comment art becomes easy.

The comment art management system according to another aspect may further include a registration unit configured to register the post comment art as the registered comment art in a database when the receiving unit receives the post comment art including a character string of a plurality of lines from the poster terminal. In this case, the post comment art is added as a new registered comment art. Accordingly, it is possible to enrich the database so that various comment art can be provided by increasing the number of registered comment art that can be candidates for the target comment art.

In a comment art management system according to another aspect, the receiving unit may receive the post comment art as text data. The registration unit may convert the received post comment art into image data, and register the image data in the database as registered comment art. By converting the data representing the comment art from text data to image data, even when the display size of the comment art is changed, the shape of the illustration or the figure represented by the comment art can easily be maintained.

In the comment art management system according to another aspect, the plurality of viewer terminals may include the target person terminal and one or more other viewer terminals. The receiving unit may receive, from the other viewer terminal, a request to display conflicting comment art including a character string of a plurality of lines. When the display of the conflicting comment art based on the display request and the display of the target comment art conflict with each other, the display control unit may display the target comment art on the target person terminal and does not necessarily display the target comment art on one or more other viewer terminals. In this case, conflict between the display of the conflicting comment art and the display of the target comment art is avoided or suppressed, and the visibility of each comment art is improved.

In a comment art management system according to another aspect, the main content may be content distributed from a distributor terminal. The display control unit may adjust a display method of the target comment art based on at least one of user information of a target person who uses the target person terminal and user information of a distributor who uses the distributor terminal. In this case, for example, the display method of the target comment art may be adjusted based on the relationship between the target person and the distributor. Accordingly, it is possible to adopt various display method adjustment methods such as preferentially displaying the comment art of the user with a higher view count of main content distributed by the distributor.

Modified Example

The embodiments of the present disclosure have been described above in detail. However, the present disclosure is not limited to the embodiments described above. Various modifications can be made to the present disclosure without departing from the gist thereof.

For example, the comment art management system 1 may display the target comment art on the condition that the target person consumes points available in the comment art management system 1. Then, the comment art management system 1 may give points to a poster who posted the displayed target comment art. The points may be stored as user information in the database 50.

The comment art management system 1 may store the number of times that each registered comment art is displayed as the target comment art. In this case, the comment art management system 1 may display the registered comment art that has been displayed as the target comment art a large number of times and the poster of the registered comment art in a ranking format.

When extracting a registered comment art that is a candidate for the target comment art from among a plurality of registered comment art registered in the database 50, the extraction unit 12 may extract the registered comment art based on the content of another comment already displayed on the main content. As an example, the extraction unit 12 may analyze the context of another comment that has already been displayed and extract a registered comment art to which a tag of content associated with the content of the comment is assigned. The comment may be comment art, may be a character string (that is, a phrase) representing a meaning as a word instead of a design, or may include both comment art and a phrase.

When the specifying unit 13 performs the selecting process of the target comment art, the comment art management system 1 may perform the displaying process of the target comment art regardless of whether or not there is a request to display the target comment art. For example, after the selecting process of the target comment art is executed, the comment art management system 1 may automatically display the target comment art without receiving an operation from the target person for displaying the target comment art.

The server 10 may include the display control unit. The display control unit of the server 10 may have at least a portion of the functions of the display control unit 24 described above. For example, the display control unit of the server 10 may execute the adjustment processing of the display mode of the target comment art.

Although the comment art management system 1 is configured using the server 10 in the aforementioned embodiment, the comment art management system 1 may be applied to direct distribution between user terminals without using the server 10. In this case, each functional element of the server 10 may be implemented in any one of the user terminals, for example, in any one of the distributor terminals, or the viewer terminal. Alternatively, individual functional elements of the server 10 may be separately implemented in a plurality of user terminals, for example, separately implemented in a distributor terminal and a viewer terminal. In this regard, the comment art management program may be implemented as a client program.

In the present disclosure, the expression "at least one processor executes a first process, executes a second process, and executes an n-th process" or an expression corresponding thereto is a concept including a case where an execution subject (that is, a processor) that performs n pieces of processing from a first processing to an n-th processing is changed before completion. That is, this expression is a concept including both a case where all of the n pieces of processing are executed by the same processor and a case where the processor is changed according to an arbitrary policy while performing the n pieces of processing.

The processing procedure of the method executed by at least one processor is not limited to the example in the above embodiment. For example, some of the steps (processes) described above may be omitted, or the steps may be executed in a different order. Any two or more of the aforementioned steps may be combined, or some of the steps may be modified or deleted. Alternatively, other steps may be executed in addition to the aforementioned steps.

EXPLANATION OF CODES

1: Comment art management system
10: Server
11: Registration unit
12: Extraction unit
13: Specifying unit
14: Communication unit
20: Viewer terminal
20A: Target person terminal
20B: Other viewer terminal
21: Post receiving unit
22: Request receiving unit
23: Selection receiving unit
24: Display control unit
25: Communication unit
30: Distributor terminal
40: Poster terminal
50: Database
301, 302, 303, 401: Screen
311, 411: Main content
312, 412: Target comment art
413: Conflicting comment art
P1: Server program
P2: Client program

What is claimed is:
1. A comment art management system configured to display a target comment art including a character string of a plurality of lines on a plurality of viewer terminals including a target person terminal, the comment art management system comprising:
   a receiving unit configured to receive specifying information for specifying the target comment art from the target person terminal;
   a specifying unit configured to specify the target comment art from a plurality of registered comment art based on the specifying information by referring to a database storing the plurality of registered comment art, each of the plurality of registered comment art including a character string comprised of a plurality of lines;

a registration unit configured to register post comment art as registered comment art in the database when the receiving unit receives the post comment art including a character string of a plurality of lines from a poster's terminal; and a display control unit configured to display the specified target comment art superimposed on main content displayed on the plurality of viewer terminals, wherein the specifying information categorizes the target comment art based on a figure represented by the character string comprised of a plurality of lines, and wherein the receiving unit is configured to receive the post comment art as text data; and the registration unit is configured to convert the received post comment art to image data based on the specifying information, and further configured to register the image data in the database as part of a plurality of registered comment art.

2. The comment art management system according to claim 1, wherein the display control unit is configured to display at least one of the plurality of registered comment art on the target person terminal in a selectable manner when the receiving unit receives a request to display registered comment art; and the specifying unit is configured to specify the registered comment art selected on the target person terminal as the target comment art.

3. The comment art management system according to claim 1, wherein the plurality of viewer terminals include the target person terminal and one or more other viewer terminals;

the receiving unit configured to receive from one of the one or more other viewer terminals a request to display conflicting comment art including a character string of a plurality of lines; and when display of the conflicting comment art based on the display request and display of the target comment art conflict with each other, the display control unit is configured to display the target comment art on the target person terminal and further configured to not display the target comment art on the one of the one or more other viewer terminals.

4. The comment art management system according to claim 1, wherein the main content is content distributed from a distributor terminal; and the display control unit is configured to adjust a display mode of the target comment art based on at least one piece of user information of a target person who uses the target person terminal and user information of a distributor who uses the distributor terminal.

5. A comment art management method executed by a comment art management system including a processor configured to display a target comment art including a character string of a plurality of lines on a plurality of viewer terminals including a target person terminal, the method comprising:

receiving specifying information for specifying the target comment art from the target person terminal as text data;

specifying the target comment art from a plurality of registered comment art based on the specifying information by referring to a database that stores the plurality of registered comment art, each including a character string of a plurality of lines;

registering post comment art as registered comment art in the database when the receiving unit receives the post comment art including a character string of a plurality of lines from a poster's terminal;

converting the received post comment art to image data based on the specifying information;

registering the image data in the database as part of a plurality of registered comment art; and displaying the specified target comment art superimposed on main content displayed on the plurality of viewer terminals, wherein the specifying information categorizes the target comment art based on a figure represented by the character string comprised of a plurality of lines.

6. A comment art management program stored on a non-transitory computer readable medium that causes a computer to function as a comment art management system configured to display a target comment art including a character string of a plurality of lines on a plurality of viewer terminals including a target person terminal, the program performing:

receiving specifying information for specifying the target comment art from the target person terminal as text data;

specifying the target comment art from a plurality of registered comment art based on the specifying information by referring to a database that stores the plurality of registered comment art, each including a character string of a plurality of lines;

registering post comment art as registered comment art in the database when the receiving unit receives the post comment art including a character string of a plurality of lines from a poster's terminal;

converting the received post comment art to image data based on the specifying information;

registering the image data in the database as part of a plurality of registered comment art; and displaying the specified target comment art superimposed on main content displayed on the plurality of viewer terminals wherein the specifying information categorizes the target comment art based on a figure represented by on the character string comprised of a plurality of lines.

* * * * *